United States Patent [19]

Fujioka

[11] 4,452,101
[45] Jun. 5, 1984

[54] TRANSMISSION FOR A WORKING VEHICLE

[75] Inventor: Kazuyoshi Fujioka, Tokyo, Japan

[73] Assignee: Nissan Motor Company, Limited, Yokohama, Japan

[21] Appl. No.: 250,004

[22] Filed: Apr. 1, 1981

[30] Foreign Application Priority Data

Apr. 10, 1980 [JP] Japan ................................ 55-47750

[51] Int. Cl.³ ............................................ F16H 47/00
[52] U.S. Cl. ...................................... 74/733; 74/335; 192/87.18; 192/87.19
[58] Field of Search ................ 74/732, 733, 730, 335; 192/87.19, 87.18

[56] References Cited

U.S. PATENT DOCUMENTS

| | | |
|---|---|---|
| 3,151,718 | 10/1964 | Temple . |
| 3,326,066 | 6/1967 | Murphy ................................ 74/732 |
| 3,352,392 | 11/1967 | Black et al. ....................... 192/87.19 |
| 3,541,791 | 11/1970 | Lvovsky et al. . |
| 3,613,480 | 7/1970 | Shull ..................................... 74/733 |
| 3,702,648 | 11/1972 | Mori ................................ 192/87.19 |
| 3,799,304 | 3/1974 | Richmond et al. .................... 74/732 |
| 3,823,801 | 7/1974 | Arnold ............................. 192/87.19 |
| 3,840,092 | 10/1974 | Higuchi et al. ................... 192/87.19 |
| 3,882,738 | 5/1975 | Audiffred, Jr. et al. .......... 192/87.19 |
| 3,937,107 | 2/1976 | Lentz . |
| 3,938,637 | 2/1976 | Murakami ........................ 192/87.19 |
| 4,046,160 | 9/1977 | Horsch .............................. 192/87.18 |
| 4,090,414 | 5/1978 | White . |
| 4,253,553 | 3/1981 | Yamada et al. .................. 192/87.19 |

FOREIGN PATENT DOCUMENTS

| | | | |
|---|---|---|---|
| 0960111 | 12/1974 | Canada .................................. 74/732 |
| 2557549 | 7/1976 | Fed. Rep. of Germany . |
| 2716531 | 11/1977 | Fed. Rep. of Germany . |
| 2701299 | 7/1978 | Fed. Rep. of Germany ........ 74/733 |
| 1180071 | 1/1959 | France .................................. 74/732 |
| 1439245 | 6/1976 | United Kingdom ................. 74/733 |

*Primary Examiner*—Allan D. Herrmann
*Assistant Examiner*—D. Wright
*Attorney, Agent, or Firm*—Schwartz, Jeffery, Schwaab, Mack, Blumenthal & Koch

[57] ABSTRACT

A power transmission has a valve means capable of applying hydraulic pressure to forward and reverse drive clutches and first and second speed clutches corresponding to the position of shift lever. The valve means has a plurality of ports respectively corresponding to the forward and reverse drive clutches and the first and second clutches so that it reverse drive clutches and the first and second clutches so that it may vary the clutches to be applied the hydraulic pressure corresponding to the shift lever position. The valve means applies hydraulic pressure to either one of forward and reverse drive clutches and either one of first and second clutches while the vehicle being in driving mode.

6 Claims, 6 Drawing Figures

TRANSMISSION FOR A WORKING VEHICLE

BACKGROUND OF THE INVENTION

The present invention relates generally to a power transmission for a working vehicle, such as, for example, a fork-lift car or the like. More specifically, the invention relates to a hydraulic pressure control system for the power transmission of the working vehicle, which system can shift between a forward and reverse drive in respective first and second gear positions with a single shift lever.

In the conventional working vehicle transmission, it has been required to incorporate two shift levers for switching between forward and reverse drive and for shifting the gear position. Since the working vehicle is required to frequently switch between forward and reverse drive, it is quite complicate to operate two shift levers for switching driving direction and shifting gear position. Further, the clutch of the working vehicle is thus frequently operated in switching the driving direction and shifting the gear position. Upon being operated from a disconnected position to a connected position, a hydraulic pressure is rapidly applied to the clutch thus preventing a moderate connection of the clutch. This tends to degrade drivability of the working vehicle.

SUMMARY OF THE INVENTION

Therefore, it is an object of the present invention to provide a power transmission system which can be operated with a single shift lever for switching both driving direction and shifting the gear position.

Another and more specific object of the invention is to provide a hydraulic pressure control system for the working vehicle transmission, which can operate the transmission gear position between forward and reverse drive and plural varied speed gear positions.

To accomplish the above-mentioned and other objects, a power transmission, according to the present invention, has a valve means capable of applying hydraulic pressure to forward and reverse drive clutches and first and second speed clutches corresponding to the position of the shift lever. The valve means has a plurality of ports respectively corresponding to the forward and reverse drive clutches and the first and second clutches so that it the clutches which are applied with hydraulic pressure corresponding to the shift lever position may be varied. The valve means applies hydraulic pressure to either one of the forward and reverse drive clutches and either one of the first and second clutches while the vehicle is in the driving mode.

According to one embodiment of the present invention, there is provided a power transmission for a working vehicle comprising a power transmitting means to be driven by an engine output and provided a torque corresponding to the engine output torque, a transmission gear assembly shiftable between first, second, third, fourth and fifth gear position, which transmission gear assembly drives the vehicle in neutral position in the first gear position, in forward first speed gear position in second gear position, forward second speed gear position in the third gear position, in reverse first speed gear position in the fourth gear position and in reverse second speed gear position in the fifth gear position, a driving means to be driven by the transmission gear assembly in the first, second, third, fourth and fifth gear position and transmitting the output torque to driving wheels, a clutch assembly shiftable in first, second, third, fourth and fifth clutch position for establishing interengagement between the transmission gear assembly and the driving means in the first gear position in the first clutch position, in the second gear position in the second clutch position, in the third gear position in the third clutch position, in the fourth gear position in the fourth clutch position and in the fifth gear position in the fifth clutch position, a hydraulic circuit operable by a single shift lever and shifting the clutch assembly into the first, second, third, fourth and fifth clutch positions corresponding to the shift lever position.

BRIEF DESCRIPTION OF THE DRAWINGS

The present invention will become more fully understood from the detailed description given herebelow and from the accompanying drawings of a preferred embodiment, which, however, should not be taken as limitative to the present invention but is for elucidation and explanation only.

In the drawings.

DESCRIPTION OF THE PREFERRED EMBODIMENT

Figure 1:
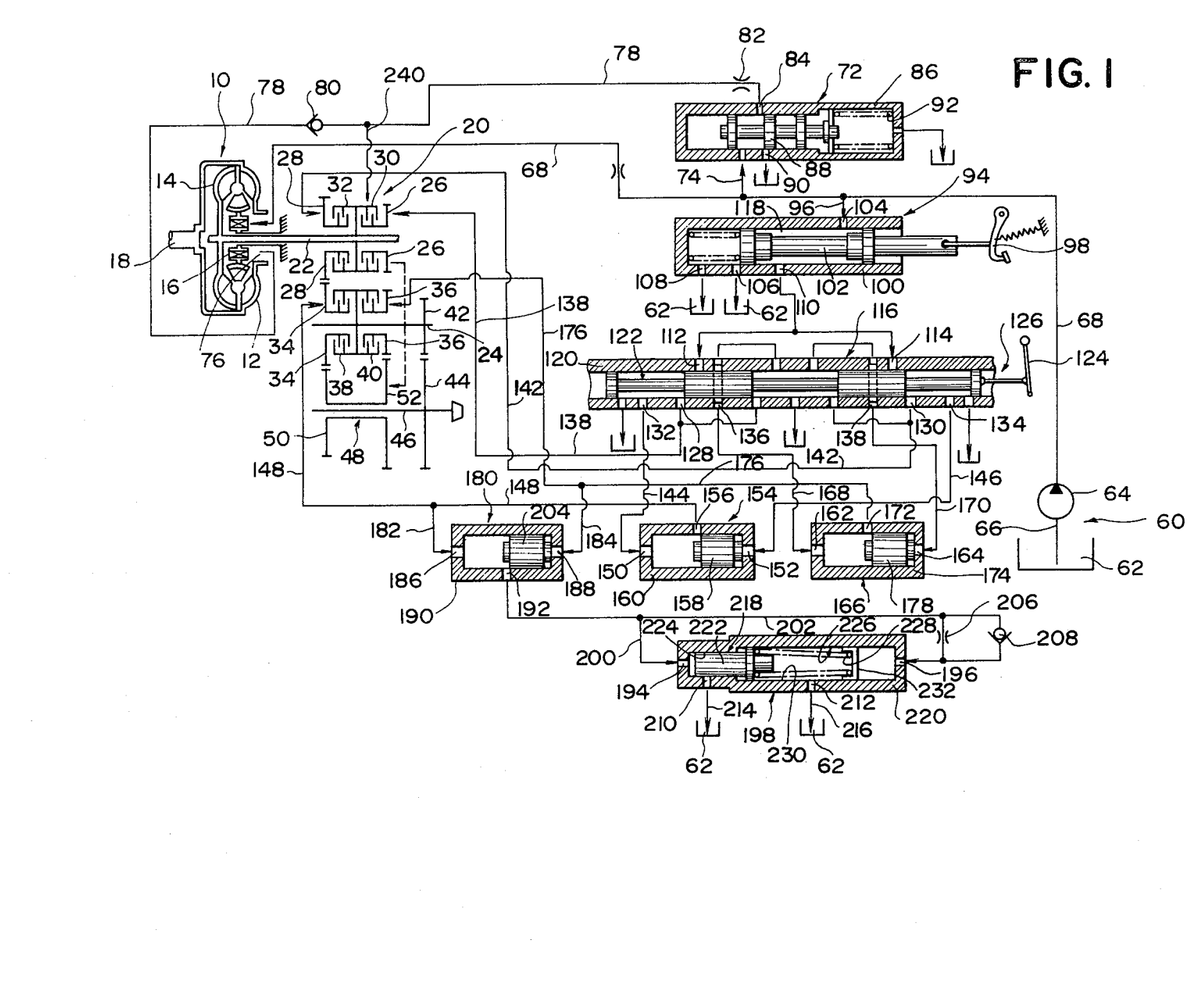
FIG. 1 is a schematic circuit diagram of a preferred embodiment of a hydraulic pressure control system for a working vehicle transmission according to the present invention.

Referring now to the drawings, particularly to FIG. 1, there is schematically illustrated a hydraulic circuit for controlling a transmission gear position. Here, the shown embodiment is the working vehicle transmission having a gear positioned in a forward drive, first speed gear position which is referred hereinafter as forward, first speed gear position, forward drive, second speed gear position hereinafter referred as forward second speed gear position, reverse drive, first speed gear position hereinafter referred as reverse, first speed gear position and reverse drive, second speed gear position hereinafter referred as reverse, second speed gear position.

The transmission includes a torque converter 10. The torque converter 10 comprises a pump impeller 12, turbine runner 14 and stator 16. The pump impeller 12 is connected with an output shaft 18 of an engine (not shown) so that it can be driven by the engine revolution. The engine output torque is thus transmitted to the torque converter 10. The turbine runner 14 is connected with a main shaft 22 of a transmission gear assembly 20. The transmission gear assembly 20 is further provided with a counter shaft 24. Forward and reverse drive gears 26 and 28 are respectively mounted on the main shaft 22 in rotatable position. The forward and reverse drive gears 26 and 28 are respectively incorporated with hydraulically operative forward and reverse drive clutches 30 and 32. Likewise, a first and second speed gears 34 and 36 are respectively mounted on the counter shaft 24 in rotatable position and are respectively incorporated with hydraulically operative first and second speed clutches 38 and 40. Therefore, the forward and reverse gears 26 and 28 are respectively connected to and disconnected from the main shaft 22 via the forward and reverse clutches 30 and 32. Similarly, the first and second speed gears 34 and 36 are respectively connected to and disconnected from the counter shaft 24 via the first and second speed clutches 38 and 40. The first speed gear 34 and the reverse gear 28 are constantly meshed together.

The counter shaft 24 has secured thereon a driving gear 42 at one end. The driving gear 42 is mashed with a driven gear 44 which is secured on a drive shaft 46. On the drive shaft 46 is mounted an idler gear 48 in freely rotatable position thereabout, which has a small gear section 50 and a large gear section 52 coaxially connected with each other. The large gear section 52 of the idler gear 48 is meshed with the forward gear 26 and the second speed gear 36, and the small gear section 50 is meshed with the first speed gear 34.

The torque converter 10 is connected with a working fluid source 60 comprising a fluid reservoir 62 and a fluid pump 64 connected through a suction passage 66, via a fluid passage 68. An orifice 70 is provided in the fluid passage 68 for equalizing the pressure and/or the amount of the working fluid supplied to the torque converter 10. The fluid passage 68 is connected with a regulator valve 72 through a passage 74 in order to control the fluid pressure at a given level. The regulator valve 72 is connected with an exhaust port 76 of the torque converter via an exhaust passage 78. The exhaust passage 78 is provided with a check valve 80 and an orifice 82. The working fluid is introduced into the regulator valve 72 through a port 84 formed in the regulator housing 86. In the internal space of the regulator housing 86, there is disposed a movable valve member 88 which is movable along the longitudinal axis of the regulator housing 86. The movable valve member 88 is constantly urged toward one direction to close an exhaust port 90 of the regulator housing 86 by a spring 92. Namely, the spring 92 serves as a source of set pressure of the regulator valve.

The fluid passage 68 is further connected with an inching valve 94 through a passage 96, which is mechanically connected with a brake pedal 98. The inching valve 94 controls the fluid pressure applied to the clutches so that the vehicle can shifted between the driven and stopped conditions at a in substantially slow speed. The inching valve 94 comprises a cylindrical valve housing 100 and a thrusting piston 102 cooperated with the brake pedal 98. The valve housing 100 is formed with an inlet port 104, exhaust ports 106 and 108 respectively connected with the fluid reservoir 62 and an outlet port 110 which is connected with inlet ports 112 and 114 of a selector valve 116 via a fluid passage 111. The inlet port 104 and outlet port 110 are constantly communicated through a recess 118 formed on the outer periphery of the valve piston 102.

The selector valve 116 has a cylindlical housing 120 in which is disposed a movable valve piston 122 cooperated with a shift lever 124 through per se well known mechanical linkage 126. The valve piston 122 moves along the longitudinal axis of the housing 120 in response to operation of the shift lever 124 and is positioned therein corresponding position to the shift lever position. The valve housing 120 is formed with a plurality of ports 128, 130, 132, 134, 136 and 138. The port 128 is communicated with the forward clutch 30 via a fluid passage 140, which port 128 is referred to as the forward drive port hereinafter. The port 130 is commicates with the reverse clutch 32 via a fluid passage 142, which port 130 is hereinafter referred to as the reverse drive port. The ports 132 and 134 respectively communicate with the first speed clutch 34 via fluid passages 144, 146 and 148. The fluid passages 144 and 146 are respectively connected with inlet ports 150 and 152 of a shuttle valve 154 and connected with the fluid passage 148 through the outlet port 156 of the shuttle valve. A valve member 158 is movably disposed within the shuttle valve housing 160 to selectively establish communication between the inlet ports 150 and 152 and the outlet port 156. The port 132 is hereinafter referred to as the forward, first speed port, and the port 134 is referred to as the reverse, first speed port. The ports 136 and 138 are respectively connected with the inlet ports 162 and 164 of a shuttle valve 166 through fluid passages 168 and 170. The shuttle valve 166 is further formed with an outlet port 172 in the periphery of a housing 174, which outlet port 172 communicates with the second speed clutch 36 via a fluid passage 176. A valve member 178 is movably disposed within the valve housing 174 so that it can move along the longitudinal axis of the housing and selectively establish communication between the inlet ports 162 and 164 and the outlet port 172. The port 136 is therefore hereinafter referred to as the forward second speed port, and the port 138 is referred to as the reverse, second speed port.

A shuttle valve 180 is connected with the fluid passages 148 and 176 via passages 182 and 184 and inlet ports 186 and 188. The valve housing 190 of the shuttle valve 180 is also formed with an outlet port 192 through which the shuttle valve is connected with the inlet ports 194 and 196 of a modulator valve 198 via fluid passages 200 and 202. A valve member 204 is disposed within the valve housing 190 of the shuttle valve 180 so that it can move along the longitudinal axis of the housing in order to selectively establish communication between the inlet ports 186 and 188 and the outlet port 192. In the fluid passage 202, an orifice 206 and a check valve 208 are provided in parallel relationship with respect to each other.

The modulator valve 198 is further provided with exhaust ports 210 and 212 respectively communicating with the fluid reservoir 62 through exhaust passages 214 and 216. A valve member 218 of the modulator valve 198 is disposed within the interior of the valve housing 220 thereof and normally places the stem portion 222 within a stepped up section 224 of a bore 226 in the housing adjacent the inlet port 194. The valve member 218 is urged toward the stepped up section 224 by a set spring 228 disposed in a major section 230 of the bore 226. The end of the set spring 228 adjacent the inlet port 196 is seated on a spring seat 232 facing the inlet port 196.

Now, the selector valve 116 is described in greater detail with reference to FIG. 2 in which is illustrated the neutral position of the transmission. The inlet ports 112 and 114 of the selector valve 116 are respectively connected with annular recesses 300 and 302 formed on the internal periphery of the valve housing 120. The forward drive port 128 communicates with an annular recess 304 and in turn, communicated with an annular recess 306 via a passage 308. Likewise, the reverse drive port 130 communicates with an annular recess 310 and with an annular recess 312 via a passage 314. The forward, first speed port 132 and the reverse, first speed port 134 are respectively communicates with annular recesses 316 and 318. The forward, second speed port 136 communicates with an annular recess 320. The annular recess 320 in turn, communicates with an annular recess 322 through a passage 324. Likewise, the reverse, second speed port 138 communicates with an annular recess 326. The recess 326, in turn, communicates with an annular recess 328 via a passage 330. The valve housing 120 is further formed with annular recesses 332, 334 and 336 which respectively communicate with the fluid reservoir 62 via passages 338, 340 and 342.

The valve piston 122 is formed with annular recesses 344, 346 and 348 on the outer periphery thereof, which annular recesses are respectively defined between lands 350, 352, 354 and 356. Each land 350, 352, 354 and 356 makes liquid sealing contact with the internal periphery of the valve housing 120 and is movable therein.

Now, the operation of the hydraulic system illustrated hereabove will be described with reference to the accompanying drawings. The working fluid supplied from the fluid pump 64 through the fluid passage 68 is first introduced into the regulator valve 72 and the inching valve 94. The working fluid pressure is regulated by the regulator valve 72. Part of the working fluid is supplied to the torque converter 10 to work as a lubricant oil. The working fluid flow through the torque converter 10 is thereafter supplied to the clutch system through a fluid passage 240 through the check valve 80. On the other hand, the working fluid supplied to the inching valve 94 flows therethrough and is introduced into the selector valve 116 through the fluid passage 111 and the inlet ports 112 and 114.

The valve piston 122 of the selector valve 116 is moved along the longitudinal axis of the valve housing and is placed at a position as shown in FIG. 2 to 6 corresponding to the shift lever position. Namely, in response to operation of the shift lever 124, the valve piston 122 of the selector valve 116 connects and disconnects the fluid passages communicating with respective forward drive clutch 28, reverse drive clutch 30, first speed clutch 36 and second speed clutch 38 and thus shifts the gear position of the transmission between the forward, first speed gear position; forward, second speed gear position; reverse, first speed gear position; reverse, second speed gear position; and neutral position.

Figure 2:
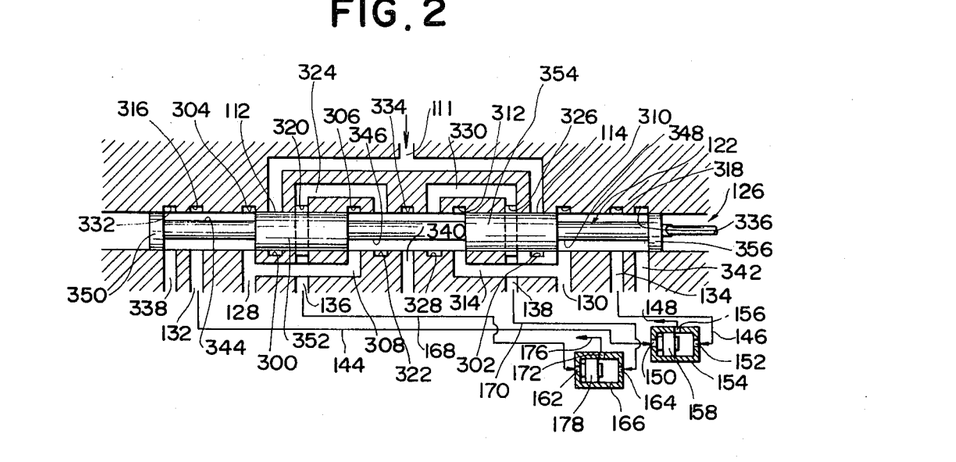
FIG. 2 is an enlarged partial section of a preferred embodiment of a selector valve in the hydraulic pressure control system, showing the valve position in the neutral position of the transmission.

As stated above, in FIG. 2 is illustrated the neutral position of the transmission. Therefore, the shift lever 124 is in the neutral position and the valve piston 122 is placed at the corresponding position to the neutral position of the shift lever 124. In this position, the lands 352 and 354 are adjacent the inlet posts 112 and 114 closing same. Therefore, the selector valve 116 is disconnected from the fluid source, i.e., the fluid reservoir 62 and the fluid pump 64 via the inching valve 94 so as not to receive the working fluid therefrom. At this valve position, the forward drive port 128 and the forward, first speed port 132 communicate with the fluid reservoir 62 via the annular recess 344, the annular recess 332 and the passage 338. The forward and reverse second speed ports 136 and 138 which are respectively connected with the annular recesses 332 and 328 via the passages 324 and 330, communicate with the fluid reservoir 62 via the annular recess 346 of the valve member 122, the annular recess 334 of the valve housing 120 and the passage 340. Likewise, the reverse drive port 130 which communicates with the annular recess 312 via passage 314, in turn, communicates with the fluid reservoir 62 through the recesses 346 and 334 and the passage 340. In the same manner, the reserve, first speed port 134 communicates with the fluid reservoir 62 via the annular recess 348 of the valve member 122, the annular recess 336 of the valve housing 120 and the passage 342. Thus, output pressure of the forward and reverse ports 128 and 130 to be transmitted to the forward and reverse drive clutches 34 and 36 is zero so as to disconnect the clutches. Also, the output pressure of the forward first and second speed ports 132 and 136 and the reverse first and second speed ports 134 and 138 via the shuttle valves 154 and 166 are zero. Therefore, the first and second speed clutches 38 and 40 are maintained in the disconnected position. In this case, the main shaft 22 transmitting the engine output via the torque converter 10 is disconnected from the counter shaft 24 and, in turn, from the drive shaft 46 to maintain the vehicle in an idling state.

Figure 3:
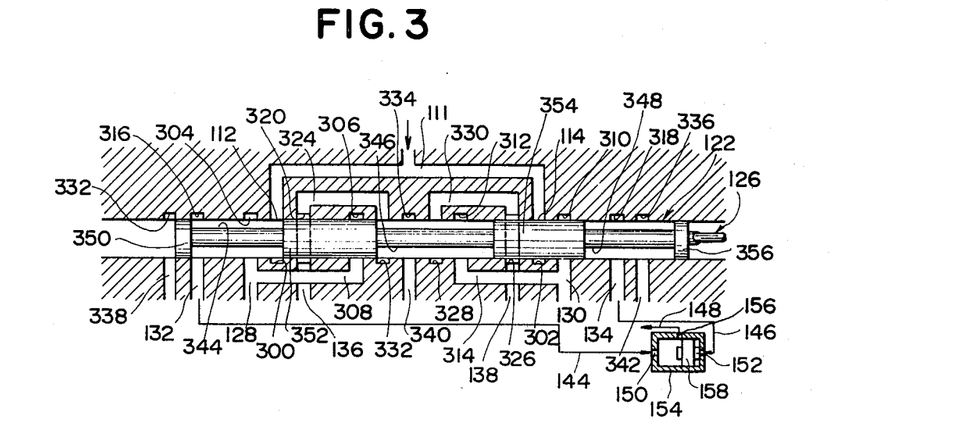
FIG. 3 is a similar view to FIG. 2, but showing the selector valve positioned in a forward drive, first gear position.

When the shift lever 124 is shifted to the forward first gear position, (in which position the shift lever 124 is operated to the right), the valve member 122 of the selector valve 116 is shifted to the forward, first gear position, as illustrated in FIG. 3. In this shift lever position, the annular recess 344 of the valve member 122 is opposite the inlet port 112 to permit admitting of the working fluid from the fluid source via the inching valve 94. The working fluid admitted through the inlet port 112 thus flows to the forward drive clutch 30 to connect the same via the fluid passage 138. At the same time, the working fluid is introduced into the first speed clutch 38 via the annular recess 344, forward first speed port 132, the shuttle valve 154 and the fluid passage 148 in order to connect the forward first speed clutch 38. Responsive to the fluid pressure applied to the forward drive clutch 30, the forward drive gear 26 is tightened onto the main shaft 22 to rotate together. The rotation of the forward drive gear 26 is transmitted to the large gear section 52 of the idler gear 48 meshed with the former and thereby transmitted to the first speed gear 36 via the small gear section 50 of the idler gear meshing with the first speed gear. The working fluid flowing out through the forward first speed port 132 is admitted to the shuttle valve 154 via the inlet port 150 thereof. By the fluid pressure, the valve member 158 of the shuttle valve 154 is moved toward the inlet port 152 to establish communication between the inlet port 150 and the outlet port 156. Thus, the working fluid flows out through the outlet port 156 into the fluid passage 148. The working fluid flowing through the fluid passage 148 flows into the first speed clutch 34 and also flows into the shuttle valve 190 via the branched passage 182 and the inlet port 186. By the fluid admitted into the shuttle valve 190, the valve member 204 is moved toward the inlet port 188 to establish communication between the inlet port 186 and the outlet port 192. The working fluid flowing through the shuttle valve 190 is introduced into the modular valve 198 via the fluid passages 200, 202 and inlet ports 194 and 196. Upon admitting the working fluid into the modulator valve 198, the working fluid flows into the stepped up section 224 of the interior of the valve housing 220 through the inlet port 194 prior to admitting the working fluid through the inlet port 196. This time lag between admission of fluid through inlet port 196 relative to inlet port 194 is achieved by means of the orifice 206 and check valve 208. Thus, there is a time delay for the fluid to flow into the section 230 of the interior of the valve housing 220. Because of the fluid pressure applied to the valve member 222 toward the inlet port 196 at the time when the fluid is not yet admitted through the inlet port 196, the valve member 222 is moved toward the inlet port 196 against the set force given by the set spring 228. The spring 228 is thus compressed until the spring force is balanced with the fluid pressure in the section 224. Because the valve member moves toward the inlet port 196, the inlet port 194 communicates with the outlet port 210 which communicates with the fluid reservoir 62 via the drain passage 214. Thereafter, the working fluid is admitted into the section 230 via the passage 202, orifice 206, check valve 208 and the inlet port 196. The working fluid introduced into the section 230 urges the spring seat 232 toward the inlet port 194. This causes an increasing of the spring pressure which is subject to both of the spring seat 232 and the valve member 222. Because of the difference of the sectional area where the fluid pressure is applied between the sections 224 and 230, the spring seat 232 moves toward the inlet port 194 against the fluid pressure in the section 224 and the spring force given by the set spring 228. Thus, the valve member is urged toward the inlet port 194 against the fluid pressure applied thereto so as to close the outlet port 210.

Therefore, the modulator valve 198 functions to reduce the fluid pressure upon shifting the shift lever 124 to the forward, first speed position and to moderately increase the fluid pressure applied to the first speed clutch thereafter. Finally, the modulator valve 198 is returned to the inoperative position for flow of the working fluid to the first speed clutch 34 through the fluid passage 148. By application of the fluid pressure, the first speed clutch 34 is fixed onto the counter shaft 24 to drive the same with the engine revolution transmitted via the engine output shaft 18, the torque converter 10, the main shaft 22, the forward drive gear 26, the idler gear 48 and the first speed gear 34. The rotation of the counter shaft 24 is transmitted to the drive shaft 46 via driving gear 42 and the driven gear 44. Thus, the drive shaft 46 is driven in the forward drive direction at a first speed.

At this shift lever position, the inlet port 114 of the selector valve 116 is closed by the land 354 of the valve member 122. Therefore, the working fluid is not supplied to the reverse drive port 130 which then communicates the annular recess 346 of the valve member through the annular recess 312 and the passage 314. In turn, the reverse drive port 130 communicates with the fluid reservoir 62 via the annular recess 346, the annular recess 334 of the valve housing 120 and the drain passage 340. Likewise, the forward and reverse second speed ports 136 and 138 communicate with the annular recess 346 via the passages 324 and 330 and the annular recesses 332, 328 and in turn, with the fluid reservoir 62 via the annular recesses 346 and 324 and the drain passage 340. Also, the reverse first speed port 134 is disconnected from the fluid source and communicates with the fluid reservoir 62 via the annular recesses 348 and 336 and the drain passage 342. Thus, the hydraulic pressure applied to the reverse clutch 32 and the second speed clutch 40 are each zero to disconnect the reverse drive gear 28 and the second speed gear 36 from the main shaft 22 and counter shaft 24 respectively.

Figure 4:
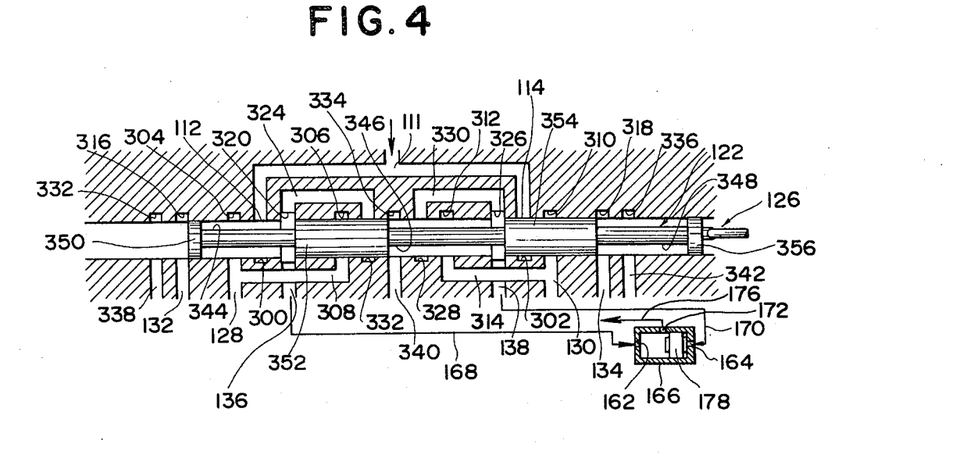
FIG. 4 is a similar view to FIG. 2, but showing the selector valve positioned in a forward drive, second gear position.

When the shift lever 124 is operated to shift the transmission gear position into the forward, second speed gear position, the valve member 122 further travels toward right in the drawings and is then positioned at the forward, second speed gear position as shown in FIG. 4. In this shift lever position, the inlet port 112 communicates with the annular recess 344 of the valve member 122, and the inlet port 114 is closed by the land 354 and thus disconnected from any ports. Therefore, the working fluid supplied from the fluid pump 64 via the fluid passages 68 and 104 and the inching valve 94 is admitted into the selector valve 116 via the inlet port 112. At this valve position, the forward drive port 128 communicates with the inlet port 112 via the annular recess 344. Therefore, the working fluid admitted into the selector valve 116 via the inlet port 112 flows through the forward drive port 128 and the fluid passage 138 to apply the hydraulic pressure to the forward drive clutch 30. In response to application of the hydraulic pressure, the forward drive clutch 30 engages with the forward drive gear 26 so as to establish interengagement between the forward drive gear 26 and the main shaft 22. Thus, the forward drive gear 26 is driven together with the main shaft 22 by the engine output which is transmitted via the engine output shaft 18 and the torque converter 10. The rotation of the main shaft 22 is thus transmitted to the idler gear 48 via the large gear section 52 thereof which meshes with the forward drive gear 26. Since the idler gear 48 mashes both of the first speed gear 34 and the second speed gear 36 via respectively opposing small gear section 50 and the large gear section 52, the first and second speed gears 34 and 36 are driven.

At the same time, the forward, second speed port 136 is opposite the annular recess 344 to permit fluid flow therethrough. The working fluid flows out through the forward, second speed port 136 and is admitted to the shuttle valve 166 via the fluid passage 168 through the inlet port 162. The valve member 178 in the shuttle valve 166 is forced toward the inlet port 164 by the fluid pressure. Because of the motion of valve member 178, the inlet port 162 communicates with the outlet port 172. Therefore, the working fluid flows through the fluid passage 176. The working fluid flowing through the fluid passage 176 is admitted to the shuttle valve 180 via the fluid passage 184 and the inlet port 188 thereof. The valve member 204 in the shuttle valve 180 is thus moved toward the inlet port 186 to establish communication between the inlet port 188 and the outlet port 192. Therefore, the fluid passage 176 communicates with the modulator valve 198 via the fluid passage 184, the shuttle valve 180 and fluid passages 200 and 202. Similar to the foregoing shifting operation to forward first speed gear position, the working fluid flows into the stepped up section 224 of the interior of the valve housing 220 through the inlet port 194 prior to the flow of working fluid through the inlet port 196. Since the fluid flowing through the fluid passage 202 passes through the orifice 206 and check valve 208, there is provided a time lag for the fluid to flow into the section 230 of the interior of the valve housing 220. Because of the fluid pressure applied to the valve member 222 toward the inlet port 196 at the time when the fluid is not yet admitted through the inlet port 196, the valve member 222 is moved toward the inlet port 196 against the set force given by the set spring 228. The spring 228 is thus compressed until the spring force is balanced with the fluid pressure in the section 224. Because of the valve member motion toward the inlet port 196, the inlet port 194 is placed in communication with the outlet port 210 which communicates with the fluid reservoir 62 via the drain passage 214. Thereafter, the working fluid is admitted into the section 230 via the passage 202, orifice 206, check valve 208 and the inlet port 196. The working fluid introduced into the section 230 urges the spring seat 232 toward the inlet port 194. This causes an increasing of the spring pressure subject to both of the spring seat 232 and the valve member 222. Because of the difference of the sectional area where the fluid pressure is applied between the sections 224 and 230, the spring seat 232 moves toward the inlet port 194 against the fluid pressure in the section 224 and the spring force given by the set spring 228. Thus, the valve member is urged toward the inlet port 194 against the fluid pressure applied thereto so as to close the outlet port 210.

The working fluid flowing through the fluid passage 176 is thus first reduced in pressure upon the shift lever being shifted and thereafter the pressure is moderately increased This leads to the result that application of hydraulic pressure to the second clutch 40 can be moderately effected so that one can minimize the shock caused by engagement between the second speed clutch 40 and the second speed gear 36.

Because of engagement of the second speed clutch 40, the second speed gear 36 is fixed onto the counter shaft 24 to transmit the engine output thereto. Thus, the counter shaft 24 is driven together with the second speed gear 36 and in turn, together with the driving gear 42 secured thereonto. The driving gear 42 transmits the rotation to the driven gear 44 mashing thereto and drives the drive shaft 46 in the forward direction at the second speed.

Returning to FIG. 4, in this valve position, the forward, first speed port 132 is disconnected from the fluid source by the land 350 and communicates with the drain passage 338 via the annular recess 332. Likewise the reverse drive port 130 is disconnected from the fluid source by the lands 352 and 354. The reverse drive port 130, in turn, communicates with the drain passage 340 via the passage 314, the annular recesses 346 and 334. Also, the reverse, second speed port 138 is opposite the annular recess 346 and thus communicates therethrough the drain passage 340. On the other hand, the reverse, first speed port 134 is opposite the annular recess 348 and communicates with the drain passage 342 via the annular recess 336 opposing to the annular recess 348.

Figure 5:
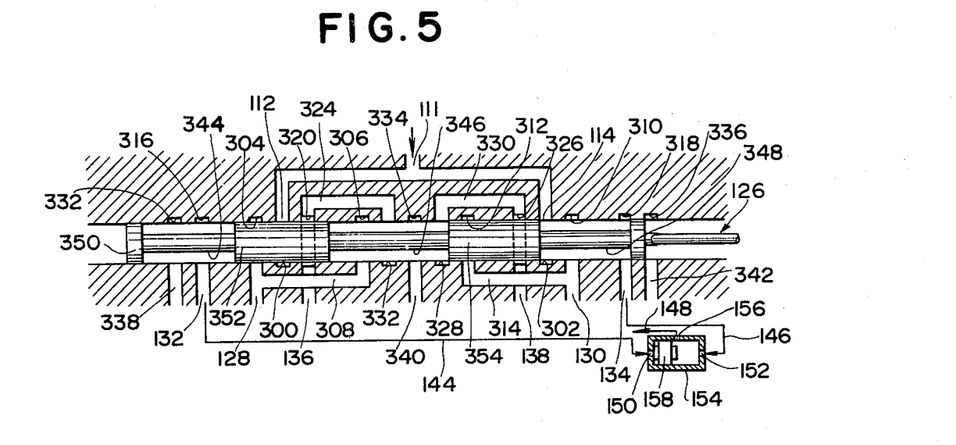
FIG. 5 is a similar view to FIG. 2, but showing the selector valve positioned in a reverse drive, first gear position.

If the shift lever 124 is shifted into the reverse, first gear position and thus the valve member 122 of the selector valve 116 is shifted toward the left in the drawings and into the reverse, first speed gear position as shown in FIG. 5, the inlet port 112 opposite the land 352 and thereby closed, and the inlet port 114 opposite the annular recess 348 and thereby opened. The working fluid supplied from the fluid pump 64 via the fluid passage 68 and the inching valve 94 thus flows into the annular recess 348. At this valve position, the reverse drive port 130 is opposite the annular recess 348 and therefore communicates with the inlet port 114 therethrough. The working fluid flows through the reverse drive port 130 and the fluid passage 142 and is then supplied to the reverse drive clutch 32. Because of the hydraulic pressure, the reverse drive cluth 32 engages with the reverse drive gear 28 to establish interengagement between the reverse drive gear 28 and the main shaft 22. Thus, the reverse drive gear is driven by the main shaft 22 with the engine output which is transmitted via the engine output shaft 18 and the torque converter 10. The rotation of the reverse drive gear 28 is transmitted to the first speed gear 34 meshing therewith.

At the same time, the reverse, first speed port 134 is also opposite to the annular recess 348 to permit fluid flow admitted from the inching valve 94 via the inlet port 114. Since the reverse, first speed port 134 is connected with the inlet port 152 of the shuttle valve 154 via the fluid passage 146, the working fluid flowing out through the reverse, first speed port 134 is admitted into the shuttle valve 154 through the inlet port 152. The valve member 158 of the shuttle valve 154 is moved toward the inlet port 150 by the fluid pressure and establishes communication between the inlet port 152 and the outlet port 156. Then, the working fluid flows therethrough and through the fluid passage 148. As described in the valve position at the forward, first gear position, the fluid pressure of the working fluid is at first dropped and thereafter rises when the shift lever 124 is shifted by the modulator valve 198. The working fluid is thus applied to the first speed clutch 38 to engage the same with the first speed gear 34 to establish interengagement between the first speed gear 34 and the counter shaft 24. Here, since the first speed gear 34 is directly driven by the reverse drive gear 28, the counter shaft 24 is driven in opposite direction to that of forward driving. Because of the counter shaft 24 rotation, the driving gear 42 drives the drive shaft 46 via the driven gear 44 meshing therewith in reverse direction at a first speed.

Now, returing to FIG. 5, in this valve position, the forward drive port 128 communicate with the annular recess 346 via the passage 308 and the annular recess 306. At this valve position, the annular recess 346 is disconnected from the fluid source by the lands 352 and 354. On the other hand, the annular recess 346 communicates with the drain passage 340. Thus, the forward drive port 128 communicates with the drain passage 340. Likewise, the reverse, second speed port 138 communicates with the annular recess 346 via the passage 330 and the annular recess 328 and, in turn, communicates with the drain passage 340. Also, the forward, second speed port 136 communicates with the drain passage 340 through the passage 324, the annular passage 332 and 346. On the other hand, the forward, first speed port 132 is opposite the annular recess 344 and communicate with the drain passage 338 via the annular passage 332. Therefore, the forward drive port 128, forward first and second speed ports 132 and 136 and the reverse, second port 138 are respectively communicated with the drain passages 338 and 340 to drain the fluid so as to reduce the hydraulic pressure applied thereto to zero.

Figure 6:
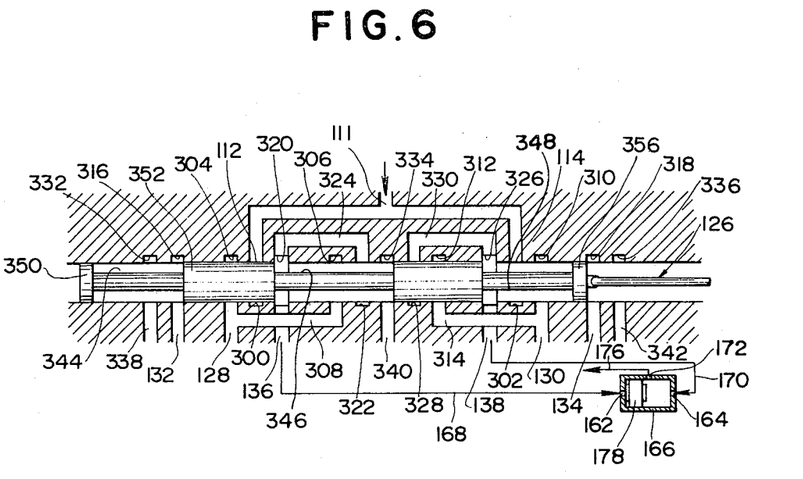
FIG. 6 is a similar view to FIG. 2, but showing the selector valve positioned in a reverse drive, in second gear position.

When the shift lever 124 is further shifted to the reverse, second speed gear position, the valve member 122 of the selector valve 116 is shifted into the reverse, second speed gear position as shown in FIG. 6. In this valve position, the annular recess 348 communicates with the inlet port 114 for admitting the working fluid therethrough. The reverse drive port 130 is opposite to the annular recess 348 and permits the working fluid to flow therethrough. The working fluid is then supplied to the reverse drive clutch 32 via the fluid passage 142 to engage the reverse clutch 32 to the reverse drive gear 28. The reverse drive gear 28 is interengaged with the main shaft 22 by engagement with the reverse drive clutch 32 so that it can be driven by the engine output transmitted through the engine output shaft 18 and the torque converter 10. The rotation of the reverse drive gear 28 is transmitted to the first speed gear 34 meshing with the reverse drive gear. The small gear section 50 of the idler gear 48 is meshed, the first speed gear 34 to be driven thereby. The idler gear 48 is thus rotate by transmission of the engine output via the main shaft 22, the reverse gear 28 and the first speed gear 34. The idler gear 48 transmits the rotation to the second speed gear 36 via the large gear section 52 thereof, which large gear section 52 meshes with the second speed gear. In this manner, the second speed gear 36 is driven in the direction opposite that for forward driving.

Here, at the same time, the reverse, second speed port 138 is opposite the annular recess 348 to permit the working fluid to flow therethrough. The working fluid flowing out through the reverse, second speed port 138 is admitted to the shuttle valve 166 via the fluid passage 170. Because of the fluid pressure applied through the inlet port 164, the valve member 178 of the shuttle valve 166 is forced toward the inlet port 162 to establish communication between the inlet port 164 and the outlet port 172. The working fluid is therefore supplied to the second speed clutch 36 via the fluid passage 176. As stated in the description of the forward, second speed valve position, the fluid passage 176 communicates with the modulator valve 198 via the fluid passage 184, the shuttle valve 180 and the fluid passages 200 and 202. Because of the function of the modulator valve, the pressure of the working fluid is first reduced upon shifting of the valve position to the reverse, second speed gear position and thereafter increased gradually. This leads to a soft engagement between the second speed clutch 40 and the second speed gear 36. By application of the hydraulic pressure, the second speed clutch 40 and the second speed gear 36 are interengaged so as to establish interengagement between the second speed gear 36 and the counter shaft 24. Thus, the counter shaft 24 is interconnected to the engine output via the second speed gear 36. The driving gear 42 secured on the counter shaft 24 is thus driven in a reverse direction to drive the drive shaft 46 in the reverse direction at the second speed via the driven gear 44.

At this valve position, the forward drive port 128 communicates with the annular recess 346 via the passage 308 and, in turn communicates with the drain passage 340 through the annular recess 334. Likewise, the forward, second speed port 136 communicates with the drain passage 340 through the annular recesses 320 and 334. The forward, first speed port 132 is opposite the annular recess 344 and thus communicates with the drain passage 338 via the annular recess 332. On the other hand, the reverse, first speed port 134 is blocked from communication with the inlet port 114 by the land 356 and communicates with the drain port 342 via the annular recess 336.

Thus, the forward drive port 128, the forward first and second speed ports 132, 136 and the reverse, first speed port 134 are respectively disconnected from the fluid source and communicated with the drain passages 338, 340 and 342. Therefore, the fluid pressure applied to respective ports are respectively zero.

As stated hereabove, the transmission gear position can be effectively shifted with a single shift lever for convenience of operation, according to the present invention.

While the present invention has been illustrated in term of the preferred embodiment of the invention, the elements thereof can be replaced by any other elements having the corresponding described functions. Further, any expected modifications from the hereabove given disclosure should be understood as being within the scope of the invention. Therefore, the invention should not be understood as limitative to the specific embodiment hereinabove given and should be understood as covering all modifications which do not depart from the principle of the invention.

What is claimed is:

1. A power transmission for a working vehicle having an engine comprising:

a torque converter to be driven by an output of said engine and provided a torque corresponding to the engine output torque;

a transmission gear assembly having forward and reverse drive gears and first and second speed gears and shiftable between first, second, third, fourth and fifth gear positions, said transmission gear assembly operative to place the vehicle in a neutral position in said first gear position, in a forward, first speed gear position in said second gear position, in a forward, second speed gear position in said third gear position, in a reverse, first speed gear position in said fourth gear position and in a reverse, second speed gear position in said fifth gear position;

a driving means to be driven by said transmission gear assembly in said first, second, third, fourth and fifth gear positions and transmitting the engine output torque to driving wheels;

a clutch assembly shiftable in first, second, third, fourth and fifth clutch positions for establishing connection between said transmission gear assembly and said driving means in said first gear position in said second clutch position, in said third gear position in said third clutch position, in said fourth gear position in said fourth clutch position and in said fifth gear position in said fifth clutch position;

said clutch assembly comprising a forward drive clutch, reverse drive clutch, first speed clutch and second speed clutch, said forward and reverse speed clutches cooperating with said torque converter and said first and second speed clutches cooperating with said driving means, said forward and reverse speed clutches and said first and second speed clutches being operatively positioned opposing said forward and reverse drive gears and said first and second speed gears respectively, of said transmission gear assembly for respectively shifting between a connected position and a released position with respect to said opposing transmission gears;

a hydraulic circuit operative by a single shift lever and shifting said clutch assembly into said first, second, third, fourth and fifth clutch positions corresponding to the shift lever position;

said hydraulic circuit including a first valve means mechanically connected with said shift lever, and selectively establishing communication between a fluid source and said clutch assembly for shifting the clutch position between said first, second, third, fourth and fifth clutch positions; and said first valve means having first, second, third, fourth, fifth and sixth ports respectively connected to said forward and reverse drive clutches and said first and second speed clutches, said first and second ports respectively connected to said forward and reverse drive clutches for establishing fluid communication therewith in accordance with said shift lever positions, said third and fourth ports respectively connected to said first and second speed clutches for establishing fluid communication therewith when said first port is in communication with said forward drive clutch in accordance with the shift lever position, and said fifth and sixth ports respectively connected to said first and second speed clutches for establishing communication therewith when said second port is in communication with said reverse drive clutch.

2. A transmission as set forth in claim 1, wherein said hydraulic circuit further includes a second valve means which is positioned between said first valve means and said clutch assembly for modulating application of the fluid pressure to said clutch assembly for providing soft-engagement between said clutch assembly and said transmission gear assembly.

3. A power transmission for a working vehicle having an engine comprising:
a main shaft cooperatively connected with an engine output shaft through a torque converter;
forward and reverse drive clutches positioned opposite forward and reverse drive gears respectively and connectable therewith for fixing said forward and reverse drive gears onto said main shaft for rotation therewith in the connected position thereof;
first and second speed clutches positioned opposite first and second speed gears respectively and connectable therewith for fixing said first and second speed gears onto a counter shaft for transmitting the engine output torque to said counter shaft;
a driving gear secured to said counter shaft and rotatable with said counter shaft;
a drive shaft having a driven gear secured thereon, said driven gear meshing with said driving gear for transmitting rotational energy from said counter shaft to said drive shaft;
a hydraulic circuit for supplying a working fluid to said forward and reverse drive clutches and first and second speed clutches, said hydraulic circuit including a selector valve means;
said selector valve means cooperating with a shift lever to be manually operated thereby and including a valve member movable in response to shifting of said shift lever, said valve member enabling communication and interrupting communication between a fluid source and said forward and reverse drive clutches and first and second speed clutches, said valve member being movable in response to operation of said shift lever between neutral, forward and reverse drive gear positions and between first speed and second speed gear positions.

4. A power transmission as set forth in claim 3, wherein said hydraulic circuit further comprises a modulator valve means within said hydraulic circuit, said modulator valve located between the first and second speed clutches and the selector valve for reducing hydraulic pressure applied to said first or second speed clutches upon the shift lever being shifted and for subsequently increasing the hydraulic pressure gradually for providing a soft engagement between the first speed clutch and first speed gear and second speed clutch and second speed gear.

5. A transmission as set forth in claim 3 or 4, wherein said selector valve means has first, second, third, fourth, fifth and sixth ports, said first and second ports respectively corresponding to said forward and reverse speed clutches for establishing communication therewith corresponding to the shift lever position, said third and fourth ports respectively corresponding to said first and second speed clutches for communicating therewith when said first port communicates with said forward drive clutch and said fifth and sixth ports respectively corresponding to said first and second speed clutches for communicating therewith when said second port communicates with said reverse clutch.

6. A transmission as set forth in claim 5, wherein said selector valve means comprises a valve housing in which are provided said first, second, third, fourth, fifth and sixth ports, said valve member being slidably disposed within said valve housing, said valve member connected with said shift lever to be positioned in a gear position corresponding to that of said shift lever, wherein, said valve member establishes communication between said first port and said forward drive clutch and said third port and said first speed clutch when said shift lever is shifted to a forward, first speed gear position, between said first port and said forward drive clutch and said fourth port and said second speed clutch when said shift lever is shifted to a forward, second gear position, between said second port and said reverse drive clutch and said fifth port and said first speed clutch when said shift lever is shifted to a reverse, first speed gear position and between said second port and said reverse drive clutch and said sixth port and said second speed clutch when said shift lever is shifted to a reverse, second speed gear position, and said valve member interrupting communication between each corresponding port and clutch when the shift lever is shifted to said neutral position.

* * * * *